United States Patent
Hendriks

(10) Patent No.: US 10,068,028 B1
(45) Date of Patent: *Sep. 4, 2018

(54) DEEP LINK VERIFICATION FOR NATIVE APPLICATIONS

(71) Applicant: Google LLC, Mountain View, CA (US)

(72) Inventor: Erik Hendriks, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/432,670

(22) Filed: Feb. 14, 2017

Related U.S. Application Data

(63) Continuation of application No. 14/194,256, filed on Feb. 28, 2014, now Pat. No. 9,608,870.

(51) Int. Cl.
*G06F 17/30* (2006.01)
*H04L 29/08* (2006.01)

(52) U.S. Cl.
CPC ........ *G06F 17/30882* (2013.01); *H04L 67/02* (2013.01)

(58) Field of Classification Search
None
See application file for complete search history.

(56) References Cited

U.S. PATENT DOCUMENTS

| | | | |
|---|---|---|---|
| 8,086,957 B2 | 11/2009 | Arrouye | |
| 7,617,225 B2 | 12/2011 | Bauchot | |
| 8,458,384 B2 | 6/2013 | Johnson | |
| 8,510,764 B1 | 8/2013 | Deselaers | |
| 8,515,979 B2 | 8/2013 | Mehta | |
| 8,554,345 B2 | 10/2013 | Fernandez | |
| 8,555,269 B2 | 10/2013 | Huang et al. | |
| 8,595,450 B2 | 11/2013 | Nguyen | |
| 9,135,346 B2 | 9/2015 | Chang et al. | |
| 9,218,429 B2 | 12/2015 | Levy et al. | |
| 9,645,980 B1* | 5/2017 | Kim | G06F 17/2235 |
| 2004/0030882 A1 | 2/2004 | Forman | |
| 2005/0160061 A1 | 7/2005 | Todd | |
| 2005/0198377 A1* | 9/2005 | Ferguson | G06F 17/30867 709/238 |

(Continued)

FOREIGN PATENT DOCUMENTS

| EP | 2474905 | 7/2012 |
|---|---|---|
| EP | 2495670 | 9/2012 |

OTHER PUBLICATIONS

Ames et al. "Richer file system metadata using links and attributes." Mass Storage Systems and Technologies, 2005. Proceedings. 22nd IEEE/13th NASA Goddard Conference on. IEEE, 2005. Retrieved on [May 8, 2018] Retrieved from the Internet:URL<https://ieeexplore.ieee.org/abstract/document/1410723/>.*

(Continued)

*Primary Examiner* — Tuan Q. Dam
*Assistant Examiner* — Cheneca Smith
(74) *Attorney, Agent, or Firm* — Fish & Richardson P.C.

(57) ABSTRACT

Methods, systems, and apparatus, including computer programs encoded on a computer storage medium, for verifying deep links in for a native application. In one aspect, a method includes verify a deep link for a first version level of a native application and serving the deep link only if aversion level of a native application installed on a requesting user device is the same as or subsequent to the version level for which the deep link is verified.

15 Claims, 6 Drawing Sheets

(56) References Cited

U.S. PATENT DOCUMENTS

| | | |
|---|---|---|
| 2007/0209080 A1 | 9/2007 | Ture |
| 2010/0257466 A1 | 10/2010 | Wroblewski |
| 2010/0306191 A1 | 12/2010 | LeBeau |
| 2011/0252038 A1 | 10/2011 | Schmidt |
| 2011/0314004 A1 | 12/2011 | Mehta |
| 2012/0124061 A1 | 5/2012 | Macbeth et al. |
| 2012/0173692 A1* | 7/2012 | Lakes .................. H04L 67/327 709/223 |
| 2012/0179706 A1 | 7/2012 | Hobbs |
| 2012/0179955 A1* | 7/2012 | French .............. G06F 17/30899 715/207 |
| 2012/0284356 A1* | 11/2012 | Luna ................ G06F 17/30902 709/213 |
| 2012/0290584 A1 | 11/2012 | De |
| 2012/0316955 A1 | 12/2012 | Panguluri et al. |
| 2012/0323898 A1 | 12/2012 | Kumar |
| 2013/0006897 A1 | 1/2013 | Jain |
| 2013/0110815 A1 | 5/2013 | Tankovich |
| 2013/0111328 A1 | 5/2013 | Khanna |
| 2013/0122861 A1 | 5/2013 | Kim |
| 2013/0124606 A1 | 5/2013 | Carpenter |
| 2013/0191360 A1 | 7/2013 | Burkard |
| 2013/0232256 A1 | 9/2013 | Lee |
| 2013/0298007 A1 | 11/2013 | Cullen |
| 2013/0325856 A1 | 12/2013 | Soto |
| 2014/0040226 A1* | 2/2014 | Sadhukha ................. G06F 8/61 707/706 |
| 2015/0156061 A1 | 6/2015 | Saxena et al. |

OTHER PUBLICATIONS

Brambilla et al. "Model-driven design and development of semantic Web service applications." ACM Transactions on Internet Technology (TOIT) 8.1 (2007): 3.Retrieved on [May 8, 2018] Retrieved from the Internet:URL<https://dl.acm.org/citation.cfm?id=1294151>.*

"Adding deep linking to Google+ posts shared from your iOS app," [online][Retrieved on Jan. 7, 2014]; Retrieved from the Internet URL: https://developers.google.com/+/mobile/ios/share/deep-link; 3 pages.

"App Linking," [online][Retrieved on Jan. 7, 2014]; Retrieved from the Internet URL: https://developers.facebook.com/docs/android/link-to-your-native-app/; 14 pages.

"Class Gecko View Content" [online][Retrieved on Jan. 2, 2014]; Retrieved from the Internet URL: people.mozilla.org/~mfinkle/geckoview/docs/org/Mozilla/gecko/GeckoViewContent.html; 4 pages.

"Deeplink.me Lets Mobile Users Navigate Through A "Web" Of Apps," [online][Retrieved on Dec. 13, 2013]; Retrieved from the Internet URL: techcrunch.com/2013/05/22/new-service-called-deeplink-me-will-let-mobile-users-navigate-through-a-web-of-apps/; 8 pages.

"Frequently Asked Questions—General Information," [online][Retrieved on Jan. 7, 2014]; Retrieved from the Internet URL: https://linksmanager.com/Frequently+Asked+Questions+-+General+Information; 8 pages.

"Google's Search Results Can Deep-Link To Your Android Apps," [online][Retrieved on Dec. 13, 2013]; Retrieved from the Internet URL: techcrunch.com/2013/10/31/android-4-4-kitkat-app-indexing/; 6 pages.

"How to determine when an application is fully launched?" [online][Retrieved on Jan. 2, 2014]; Retrieved from the Internet URL: social.msdn.microsoft.com/Forums/en-US/27e7353-eb4b-4e23-bf56-84f3efbbecba/how-to-determine-when-an-application-is-fully-launched; 5 pages.

"How to get a deep link of my application from the Windows Phone Marketplace using .NET code?" [online][Retrieved on Dec. 13, 2013]; Retrieved from stackoverflow.com/questions/13639564/how-to-get-a-deep-link-of-my-application-from-the-windows-phone-marketplace-usin; 2 pages.

"Indexing apps just like websites," [online][Retrieved on Dec. 13, 2013]; Retrieved from the Internet URL: googlewebmastercentral.blogspot.com/2013/10/indexing-apps-just-like-websites.html; 4 pages.

"Instant Pages on Google Chrome," [online][Retrieved on Dec. 16, 2013]; Retrieved from the Internet URL: chrome.blogspot.jp/2011/08/instant-pages-on-google-chrome.html; 3 pages.

"Mobile deep linking," [online][Retrieved on Dec. 13, 2013]; Retrieved from the Internet URL: en.wikipedia.org/wiki/Mobile_deep_linking; 2 pages.

"NSApplication Class Reference," [online][Retrieved on Jan. 2, 2014]; Retrieved from the Internet URL: https://developer.apple.com/library/mac/documentation/cocoa/reference/applicationkit/classcs/NSApplication_Class/Reference/Reference.html; 66 pages.

"Ready For A "Web" Of Apps? Quixey Launches AppURL, A New Way To Enable Deep Linking Across Mobile Applications," [online][Retrieved on Dec. 13, 2013]; Retrieved from the Internet URL: techcrunch.com/2013/08/02/ready-for-a-web-of-apps-quixey-launches-appurl-a-new-way-to-enable-deep-linking-across-mobile-applications/; 8 pages.

"Seven Tips For Supercharging Your Links," [online][Retrieved on Jan. 7, 2014]; Retrieved from the Internet URL: goarticles.com/article/Seven-Tips-For-Supercharging-Your-Links/3056299/; 5 pages.

"Sharing to Google+ from your Android app," [online][Retrieved on Jan. 7, 2014]; Retrieved from the Internet URL: https://developers.google.com/+/mobile/android/share/#handling_incoming_deep_links; 2 pages.

Liu et al. "VeriDroid: automating Android application verification." Proceedings of the 2013 Middleware Doctoral Symposium. ACM, 2013.Retrieved on [Jan. 7, 2017] Retrieved from the Internet: URL<http://dl.acm.org/citation.cfm?id=2541594>.

Wang et al. "A method-based ahead-of-time compiler for android applications." Proceedings of the 14th international conference on Compilers, architectures and synthesis for embedded systems. ACM, 2011. Retrieved on [Jan. 7, 2017] Retrieved from the Internet:URL<http://dl.acm.org/citation.cfm?id=2038704>.

* cited by examiner

DEEP LINK VERIFICATION FOR NATIVE APPLICATIONS

CROSS-REFERENCE TO RELATED APPLICATIONS

This application is a continuation application of, and claims priority to, U.S. patent application Ser. No. 14/194,256, now U.S. Pat. No. 9,608,870, titled "Deep Link Verification for Native Applications," filed on Feb. 28, 2014. The disclosure of the foregoing application is incorporated herein by reference in its entirety for all purposes.

BACKGROUND

The Internet provides access to a wide variety of information. For example, digital image files, video and/or audio files, as well as web page resources for particular subjects or particular news articles, are accessible over the Internet. With respect to web page resources, many of these resources are designed to facilitate the performing of particular functions, such as banking, booking hotel reservations, shopping, etc., or to provide structured information, such as on-line encyclopedias, movie databases, etc. Search engines crawl and index these resources to facilitate searching of the resources.

Furthermore, with the advent of tablet computers and smart phones, native applications that facilitate the performance of the same functions facilitated by the use of web page resources are now being provided in large numbers. Additionally, native applications that do not have websites with synchronous content, such as games, are also very popular on tablet computers and smart phones. Accordingly, search engines now also facilitate searching of these native applications.

One process by which search engines gather information for native applications is by accessing "deep links" for native applications. A deep link is an instruction specifying a particular environment instance of a native application and configured to cause the native application to instantiate the environment instance of the specified native application when selected at a user device. The native application generates the environment instance for display within the native application on a user device. For example, a deep link may specify a selection menu for a game environment; or a particular selection of a song for a music application; or a particular recipe for a cooking application; and the like.

SUMMARY

This specification describes technologies relating to verifying deep links for native applications.

In general, one innovative aspect of the subject matter described in this specification can be embodied in methods that include the actions of receiving a first set of deep links specified for a native application, each deep link specifying a particular environment instance of the native application and configured to cause the native application to instantiate an instance of the specified native application, and wherein the native application is an application operable to generate environment instances for display within the native application on a user device, the native application operating independent of a browser application that can operate on the user device; for each deep link in the first set, verifying, by the data processing apparatus, whether the deep link specified for the native application of a first version level causes the native application of the first version level to correctly instantiate the environment instance specified by the deep link; for only each deep link that is verified to cause the native application of the first version level to correctly instantiate the environment instance specified by the deep link, generating verification data that specifies that deep link is verified for the first version level of the native application; storing the verification data and the deep link in an index of deep links; receiving selections of deep links to be served to user devices within which the native application is installed, each selection for a corresponding user device; for each selection: determining a version level of the native application installed within the corresponding user device, and serving the deep link selection only if the version level of the native application installed within the corresponding user device is the same as or subsequent to the version level for which it is verified. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. By assuming forward compatibility, only a small, fixed-size piece of information is required for each deep link, resulting in an easily managed and lightweight solution. Furthermore, recrawling of deep links for later versions of a native application is not needed. Additionally, by limiting the serving of deep links based on version levels of native applications on user devices, the likelihood of serving a link that may be inoperable for a particular version is reduced, thus increasing the likelihood of a positive user experience.

The system not rely on a native application publisher providing version levels for deep links, and thus the system is robust with respect to publisher errors regarding version levels. In implementations in which a deep link no longer works with a later version and is purged from the index, a user using an older version of the native application will see fewer deep links in native application search results. This will signal the user that their native application is out of date, and will motivate the user to update to the latest version of the native application. Finally, when a new version is released, it need not be indexed by the search system for the search system to serve deep links; instead, deep links that are compatible with the new version will continue to be served. Thus, the maintenance of deep links is transparent to end users and native application publishers, and the serving of deep links that work with later versions is not delayed by version releases.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A system receives a set of deep links for a native application and verifies the deep links for the application level of the native application. As used herein, a native application generates environment instances for display on a user device within an environment of the native application, and operates independent of a browser application on the user device. A native application is an application specifically designed to run on a particular user device operating system and machine firmware. Native applications thus differ from browser-based applications and browser-rendered resources. The latter require all, or at least some, elements or instructions downloaded from a web server each time they are instantiated or rendered. Furthermore, browser-based applications and browser-rendered resources can be processed by all web-capable mobile devices within the browser and thus are not operating system specific.

Each deep link specifies a particular environment instance of the native application and is configured to cause the native application to instantiate an instance of the specified native application. In one example implementation, the system instantiates the native application at a particular version level and accesses the deep links and for each deep link in the set, determines whether the deep link specified for the native application causes the native application correctly instantiate the environment instance specified by the deep link. Each deep link that causes the native application to correctly instantiate the specified environment instance is determined to be verified for the particular version level of the native application, and for version level subsequent to the particular version level. A version level is subsequent to a particular version level if, for example, the version level is a later version level, such as a "higher" version level, or a version level that is released at a time later than the time the particular version level was released.

Figure 1:
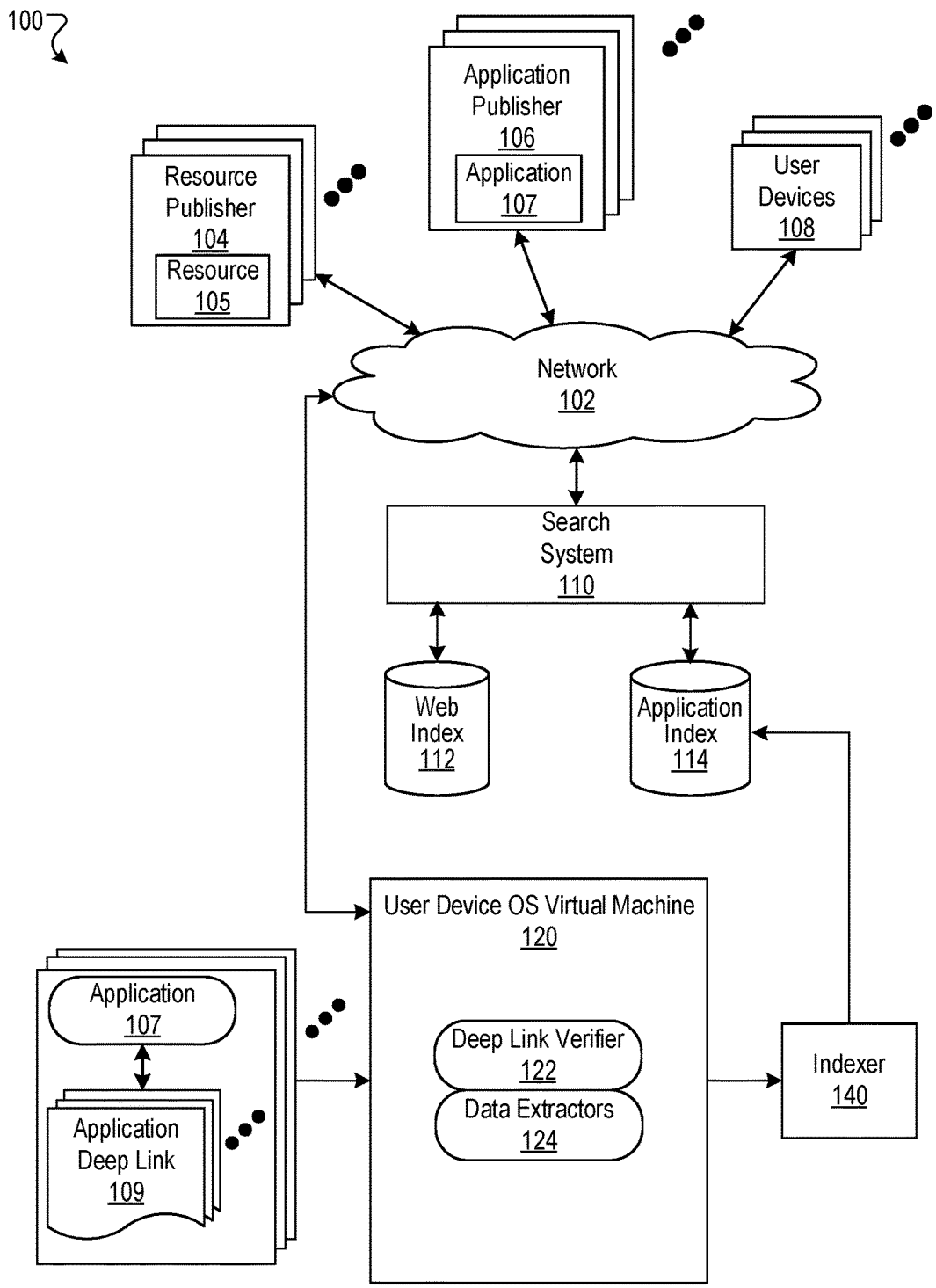
FIG. 1 is a block diagram of an example environment in which deep links for native applications are verified, indexed and searched.

The other deep links that do not cause the native application to correctly instantiate are determined to not be verified for any version of the native application (or, alternatively, not verified for the particular version of the native application and all later versions of the native application). As illustrated in FIG. 1, the system uses virtual machines to instantiate the native application and test deep links. However, the use of a virtual machine is just one way that deep links can be tested for native application; any device or system appropriate for loading a native application and testing deep links can be used.

Verification data indicating the levels of each verified deep link are stored in an index of deep links. Thereafter, when a deep link is to be served to a user device in response to a search query, the system determines a version level of the native application installed on the user device. For a deep link verified for a particular version level, the deep link will be served when the version level of the native application installed on the user device is at least the particular version level or a later version. If the version level of the native application installed on the user device is not at least the particular version level, the deep link will not be served as a search result.

These features and additional feature are described in more detail below.

FIG. 1 is a block diagram of an example environment 100 in which environment instances for native applications are indexed and searched. A computer network 102, such as the Internet, connects resource publisher web sites 104, application publishers 106, user devices 108 and a search system 110.

A resource publisher website 104 includes one or more web resources 105 associated with a domain and hosted by one or more servers in one or more locations. Generally, a resource publisher website is a collection of web pages formatted in hypertext markup language (HTML) that can contain text, images, multimedia content, and programming elements. Each website 104 is maintained by a content publisher, which is an entity that controls, manages and/or owns the website 104.

A web page resource is any data that can be provided by a publisher website 104 over the network 102 and that has a resource address, e.g., a uniform resource locator (URL). Web resources may be HTML pages, images files, video files, audio files, and feed sources, to name just a few. The resources may include embedded information, e.g., meta information and hyperlinks, and/or embedded instructions, e.g., client-side scripts.

An application publisher website 106 may also include one or more web resources 105, and also provides native applications 107. As described above, a native application 107 is an application specifically designed to run on a particular user device operating system and machine firmware. As used in this specification, an "environment instance" is a display environment within a native application and in which is displayed content, such as text, images, and the like. An environment instance is specific to the particular native application, and the native application is specific to the particular operating system of the user device 108. An environment instance differs from a rendered web resource in that the environment instance is generated within and specific to the native application, while a web resource may be rendered in any browser for which the web page resource is compatible, and is independent of the operating system of the user device.

A user device 108 is an electronic device that is under the control of a user. A user device 108 is typically capable of requesting and receiving web page resources 104 and native applications 107 over the network 102. Example user devices 108 include personal computers, mobile communication devices, and tablet computers.

To search web resources 105 and the native applications 107, the search system 110 accesses a web index 112 and an application index 114. The web index 112 is an index of web resources 105 that has, for example, been built from crawling the publisher web sites 104. The application index 114 is an index of environment instances for native applications 107, and is constructed using a virtual machine 120 and an indexing process that is described in more detail below. Although shown as separate indexes, the web index 112 and the application index 114 can be combined in a single index.

The user devices 108 submit search queries to the search system 110. In response to each query, the search system 110 accesses the web index 112 and the application index 114 to identify resources and applications, respectively, that are relevant to the query. The search system 110 may, for example, identify the resources and applications in the form of web resource search results and native application search results, respectively. Once generated, the search results are provided to the user device 108 from which the query was received.

A web resource search result is data generated by the search system 110 that identifies a web resource and provides information that satisfies a particular search query. A web resource search result for a resource can include a web page title, a snippet of text extracted from the resource, and a resource locator for the resource, e.g., the URL of a web page. A native application search result specifies a native application and is generated in response to a search of the application index 114 of environment instances. A native application search results includes a "deep link" specifying a particular environment instance of the native application and which is configured to cause the native application to instantiate the specified environmental instance. For example, selection of a native application search result may cause the native application to launch (if installed on the user device 108) and generate an environment instance referenced in the application search result in the form of a screen shot.

As described above, publishers 106 that provide native applications 107 also provide deep links to the search system 110. Furthermore, third parties may also provide deep links for native applications. Additionally, the search system 110 can discover deep links from other multiple sources, such as app maps, web page annotations, etc., and thus the set of deep links may be constantly changing. For example, an application publisher may provide a list of deep links 109 in the form of uniform resource identifiers (URIs) (or other instruction types that are specific to the native application published by the publisher). These deep links are deep links that publisher 106 desires to be crawled and indexed in the application index 114. Such deep links are typically not specific to any version of the application, and are provided at various times independent of version updates.

Publishers 106 are also providing updates to their native applications 107. These updates are provided for a variety of reasons, including bug fixes, content updates, added functionality, etc. Often, however, the updates do not affect the deep linking scheme of the native application, and thus the publishers 106 may not test deep links for version compatibility. Instead, the publishers 106 often assume prior deep links will work correctly with new application versions. However, the reverse of this assumption—that deep links provided after a newer version of an application is released will be compatible for an older version of an application—may not hold true, especially when the native application update provides additional content and other features that are not in prior versions. Accordingly, serving an indexed deep link provided for a new version of a native application for a user device with an older version of the native application may result in a poor user experience if the deep link does not properly instantiate the older version of the native application.

Figure 2:
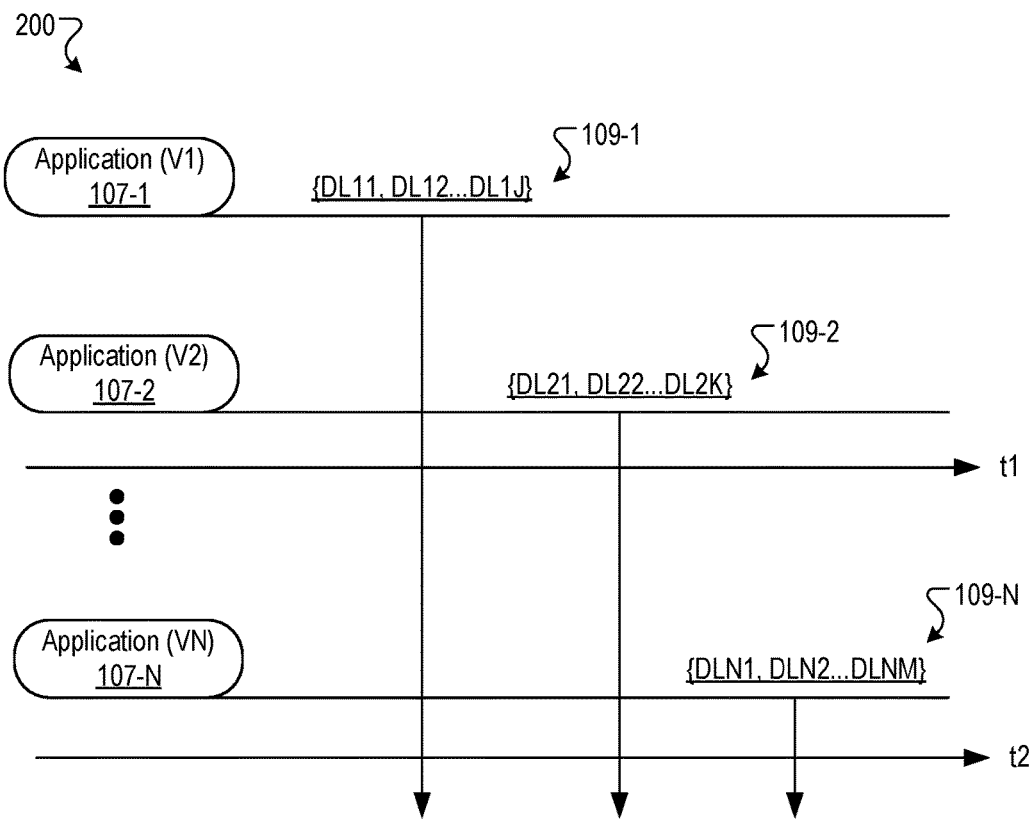
FIG. 2 is a version diagram illustrating a deep link version compatibility for a native application.

Accordingly, in some implementations, the search system 110 uses a deep link version compatibility filter for serving deep links for native applications. FIG. 2 is a version diagram 200 illustrating a deep link version compatibility for a native application.

In FIG. 2, N versions of a native application 107 are show, as indicated by application version entities 107-1 . . . 107-N. For each version of the native application 107, a corresponding set of deep links 109 are associated with the version level of the native application 107. Each deep link in each set 109 is a deep link that has been verified for the corresponding version of the native application 107. For example, for the application 107-1, corresponding to version 1 of the application 107, the deep links DL11, DL12 . . . DL1J have been verified using version 1 of the native application 107. The deep links DL11, DL12 . . . DL1J may have been received from the application publisher 106 when version 1 of the native application was released, or each may have been received and verified at any time prior to the release of the second version of the native application 107-2.

The vertical lines from each set of deep links represent the version compatibility determined by the search system 110 for each deep link in each set, and also are indicative of time. For example, assume that at time t1 the deep links in the sets 109-1 and 109-2 have been verified an indexed. Any user device for which a deep link is to be served and that has installed the second version (V2) of the native application may have a deep link from either of the sets 109-1 and 109-2 served in a native application search result. However, any user device for which a deep link is to be served and that has installed only the first version (V1) of the native application may only have a deep link from the first set 109-1 served to it. Only after a user device has updated the native application to the second version will the search system 110 serve deep links from the second set 109-2 to the user device.

Likewise, at time tN the deep links in the sets 109-1 . . . 109-N have been verified an indexed. Any user device for which a deep link is to be served and that has installed the latest version (N) of the native application may have a deep link from any of the sets 109-1 . . . 109-N served in a native application search result. However, any user device for which a deep link is to be served and that has installed only an earlier version of the native application may only have a deep link from the corresponding version verified sets served to it.

Figure 3:
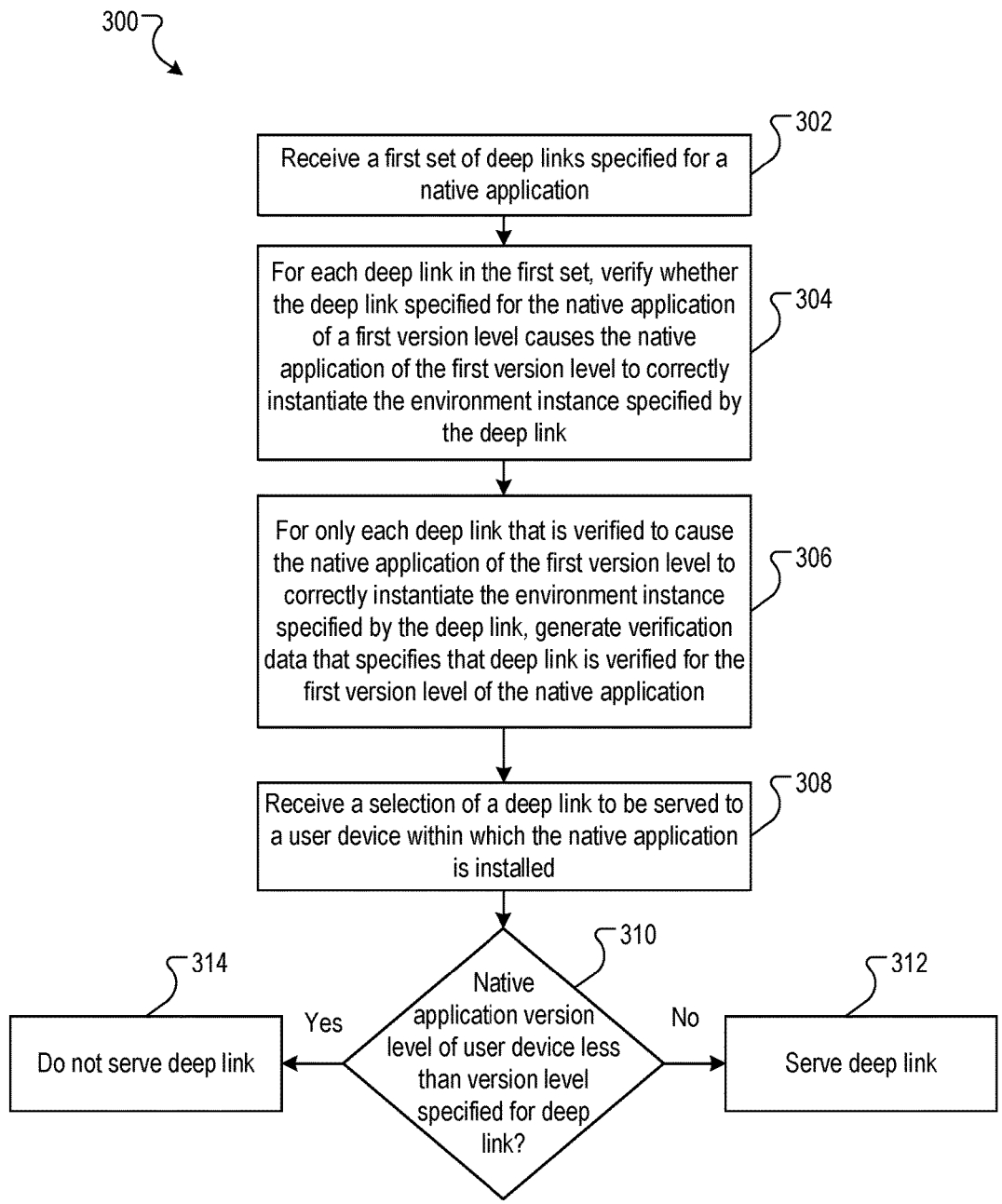
FIG. 3 is a flow diagram of an example process for verifying, indexing and serving deep links for native applications.

FIG. 3 is a flow diagram of an example process for verifying, indexing and serving deep links for native applications. The process 300 can be implemented in a data processing apparatus of one or more computers in data communication.

The process 300 receives a first set of deep links specified for a native application (302). The deep links may be received from the publisher of a native application, or generated by the search system, or submitted by users. The first set may be received all at once, or may be received incrementally. The first set is all deep links received after a particular version of a native application is released, and prior a release of a later version of the native application.

The process 300, for each for each deep link in the first set, verifies whether the deep link specified for the native application of a first version level causes the native application of the first version level to correctly instantiate the environment instance specified by the deep link (304). For example, a virtual machine 120 may be used. The virtual machine 120 may run the first version of the native application 107, e.g., the latest version released by the publisher, and may include a deep link verifier process 122 that monitors for correct instantiation. A variety of appropriate signals can be processed to determine correct instantiation of the environment instance. For example, a request timeout, an error message, a crash of the native application, or any other undesired or unexpected condition or even can indicate a failed instantiation. The absence of any such error, and/or the reception of data indicating a correct instantiation, such as confirmation data from a remote server, can indicate a verified instantiation.

The process 300, for only each deep link that is verified to cause the native application of the first version level to correctly instantiate the environment instance specified by the deep link, generates verification data that specifies that deep link is verified for the first version level of the native application (306). For example, the search system 110 may generate a version level tag for the first version level of the native application for each deep link. A data extractor 124 may be used to extract context from the particular environment instance of the native application. Such content may include text, images, etc. The deep link, the extracted data and the corresponding tag provided to an indexer 140 which indexes and stores the data in the application index 114. The deep links that are not able to be verified are not processed further, nor indexed.

The process 300 receives a selection of a deep link to be served to a user within which the native application is installed (308). For example, a user device may issue a query for which the native application is determined to be relevant, and a particular deep link from among multiple deep links for the native application stored in the application index 114 may be identified for serving in a native application search result.

The process 300 determines whether the native application version level of the user device less than version level specified for deep link (310). For example, the search system 110 may query the user device to determine if the native application is installed, and, if so, the version level of the native application. Alternatively, the search system 110 may include, or have access to, data describing the native applications installed on the user device and the corresponding version levels.

If the native application version level of user device is less than version level specified for deep link, then the process 300 does not serve the deep link (312). In such a situation, another deep link, e.g., such as a second most relevant deep link, may be checked, and the process may continue until a deep link that is verified for the version of the native application can be served.

Alternatively, no deep link may be included in the native application search result, and selection of the native application search result will result in a message informing the user that a newer version of the native application is available for installation.

In yet another alternative, a native application search result for the deep link is suppressed and not served.

If, however, the native application version level of user device is not less than version level specified for deep link, then the process 300 serves the deep link (314). The deep link is provided in a native application search result. An example native application search result is described with reference to FIG. 5 below.

Figure 4A:
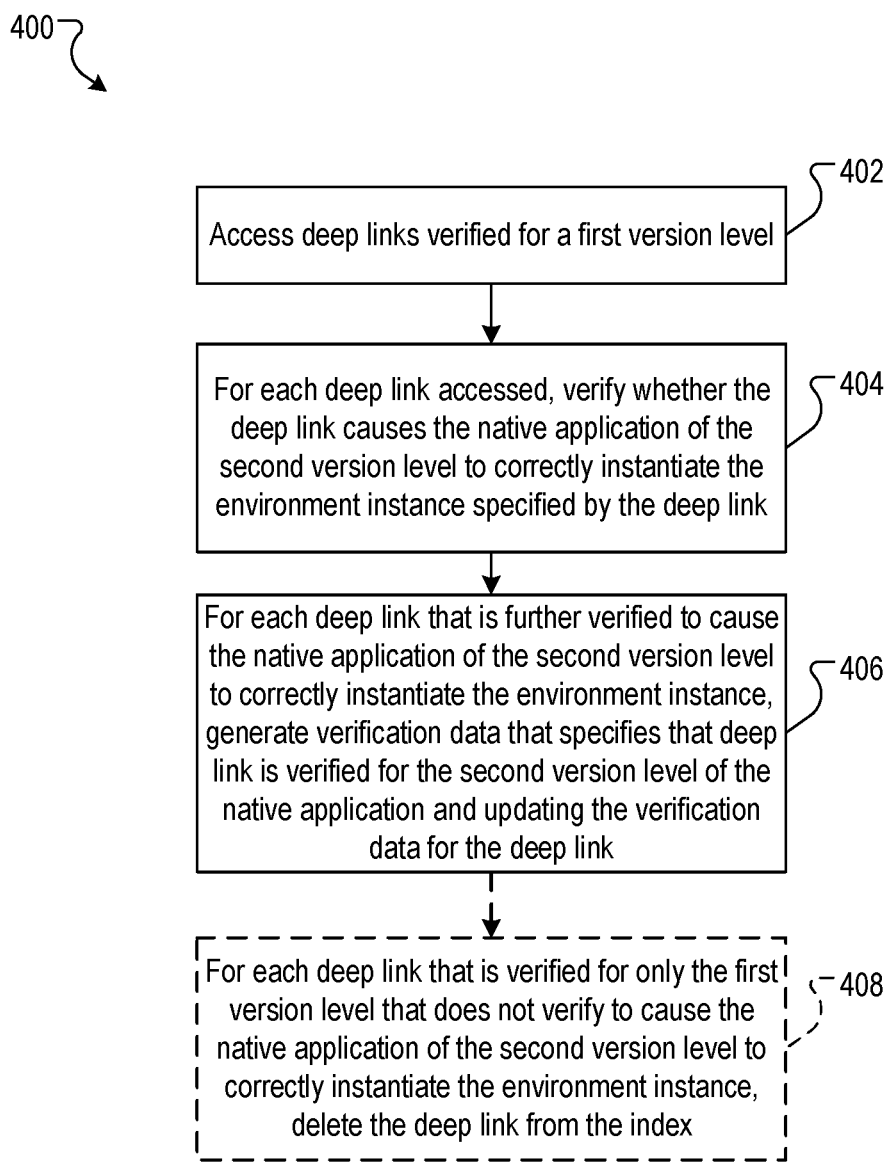
FIG. 4A is a flow diagram of an example process of verifying and indexing deep links for multiple version levels.

In some implementations, when a new version of a native application is released, the search system 110 may verify deep links previously verified for earlier versions of the native application for the latest version. FIG. 4A is a flow diagram of an example process of verifying and indexing deep links for multiple version levels. The process 400 can be implemented in a data processing apparatus of one or more computers in data communication.

The process 400 accesses deep links verified for only a first version level (402). For example, deep links verified for a prior version of a native application may be accessed when a new version of the native application is released and received by the search system 110.

The process 400, for each deep link accessed, verifies whether the deep link causes the native application of the second version level to correctly instantiate the environment instance specified by the deep link (404). This process step is similar to process step 304 of FIG. 3.

The process 400, for each deep link that is further verified to cause the native application of the second version level to correctly instantiate the environment instance, generates verification data that specifies that deep link is verified for the second version level of the native application and updating the verification data for the deep link (406). This process step is similar to process step 306 of FIG. 3. However, the index 114 need only be updated with the new version level, as the content and the deep link have already been indexed. In some implementations, each version level for which the deep link is verified may be stored in the index 114.

In an optional step, the process 400, for each deep link that is verified for only the first version level that does not verify to cause the native application of the second version level to correctly instantiate the environment instance, deletes the deep link from the index (408). This step ensures that all deep links that are stored in the index 114 will work for all versions of the application index.

Figure 4B:
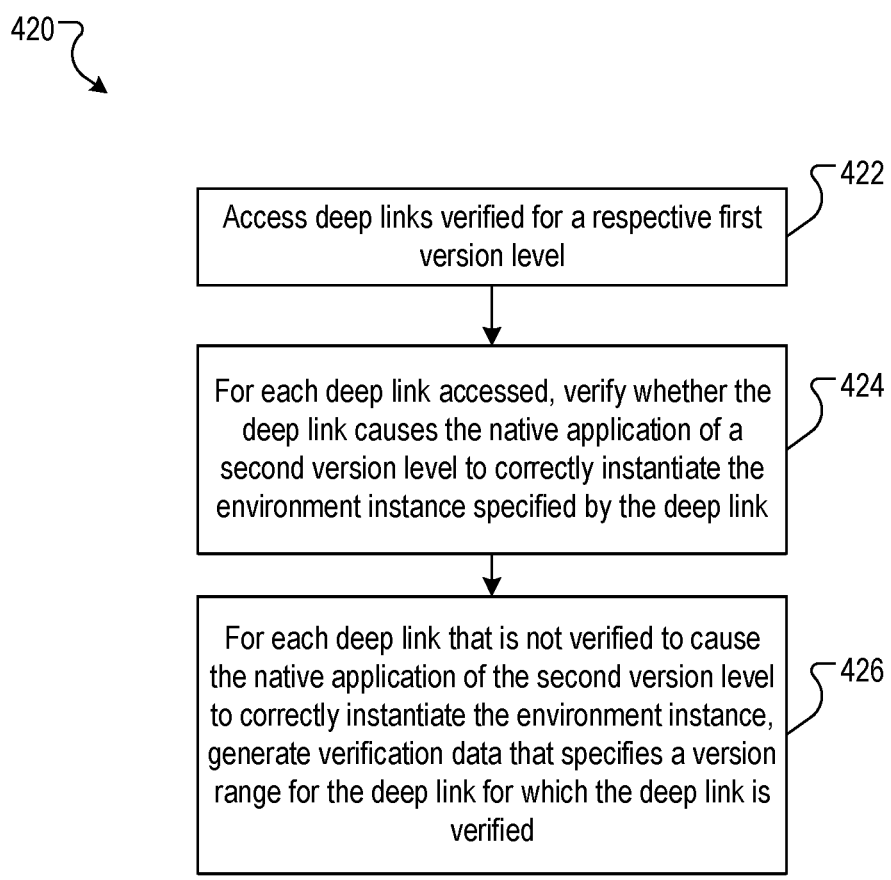
FIG. 4B is a flow diagram of an example process of verifying and indexing deep links for a version range.

The process 400 of FIG. 4A stores a version level for each level the deep link is verified. Another process that does not require storing multiple version levels is described with reference to FIG. 4B, which is a flow diagram of an example process 420 of verifying and indexing deep links for a version range. The process 420 stores the first version for which a deep link was verified, and stores a second version that is subsequent to the first version, and for which the deep link failed to verify. Thus, if a deep link verifies for multiple versions, the index does not need to be updated for each version; instead, to support legacy deep links, the index is only updated again for a deep link when the deep link fails to verify. The deep link is thus assumed to work for any version (V) where first version $<=V<$second version. If the second version is a null value in the index, then the original assumption that a link works if the application version is equal to or greater than the first version.

The process 420 accesses deep links verified for a respective first version level (422). For example, deep links verified as described with reference to FIG. 3 may be accessed.

The process 420, for each deep link accessed, verifies whether the deep link causes the native application of a second version level to correctly instantiate the environment instance specified by the deep link (424). This is a verification step as described above in process step 304.

The process 420, for each deep link that is not verified to cause the native application of the second version level to correctly instantiate the environment instance, generates verification data that specifies a version range for the deep link for which the deep link is verified (426). For example, an index may be updated to reflect a "failed version" level for the deep link, which is the second version.

Thereafter, when a deep link with an indexed first and second version level is to be served to a device, the deep link is served only is the native application only if the version level of the native application is equal to or greater than the first version level and less than the second version level.

In some implementations, the deep link with an indexed second level is not verified for later versions of the native application. In other implementations, the deep link is again tested, and if it does verify for a version level greater than the second version level, the first version level is reset to the current version level of the verifying native application, and the second version level is cleared.

Figure 5:
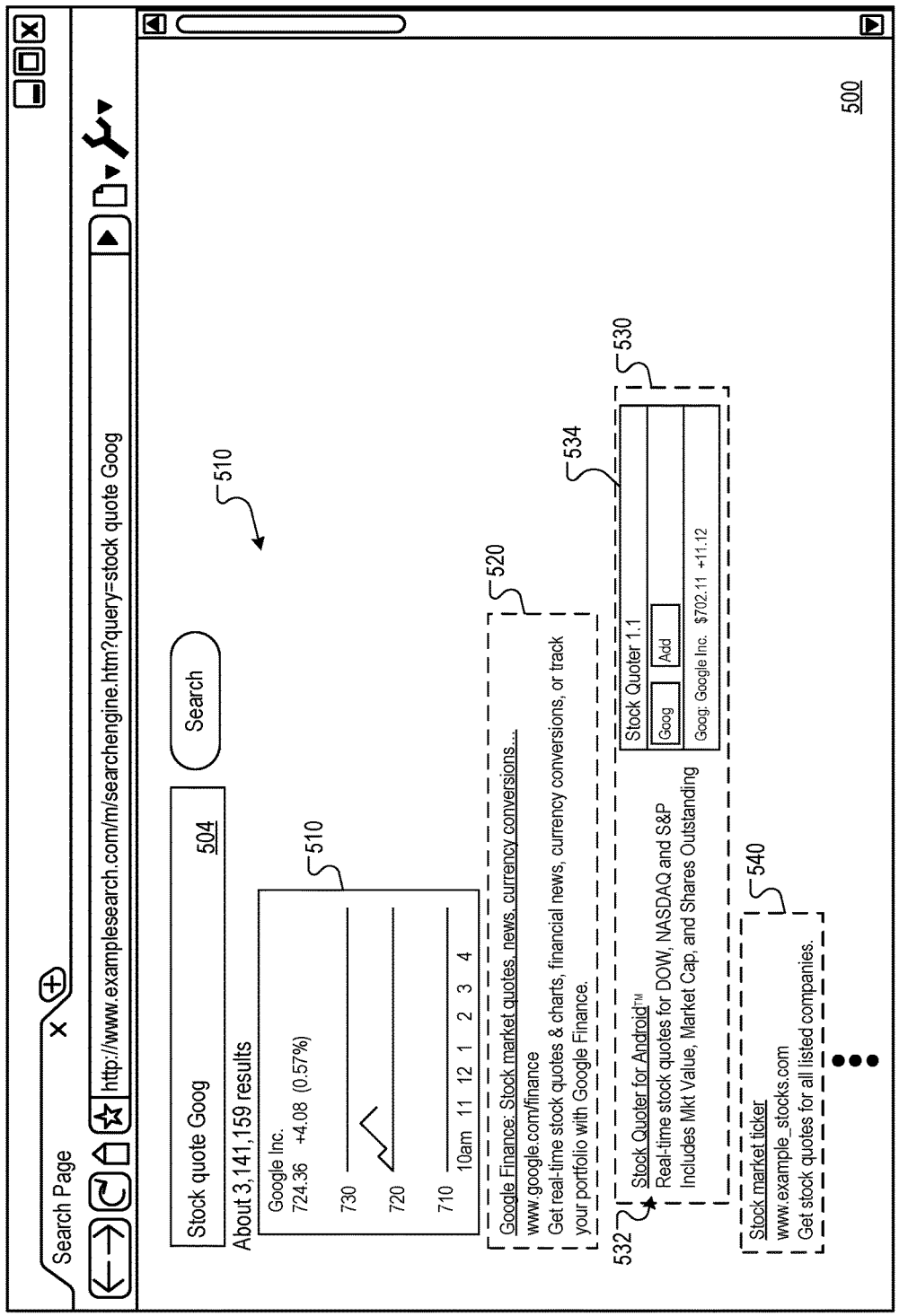
FIG. 5 is an illustration of a search results page that includes native application search results.

FIG. 5 is an illustration of a search results page 500 that includes native application search results. Displayed in the search results page 500 are search results 510, 520, 530, and 540 that are responsive to the query "Stock quote Goog" displayed in the search input field 504. The search result 510 is a real time search result that is generated, for example, in part from a real time feed. The search results 520 and 540 are web search results generated in response to a search of a web index 112 of resources. Each search result 520 and 540 references a resource that can be rendered in a browser application on a user device and includes a link to the resource, and other data, such as a snippet of text extracted for the referenced resource.

The search result 530 is a native application search result that is generated in response to a search of the application index 114 of environment instances. The search result 530 may include, for example, a snippet 532 of text and an image 534 of an environment instance. The snippet 534 may include, for example, the name of the native application (Stock Quoter for Andriod™) and text that has been extracted from one or more environment instances of the native application. Additional text can also be included, such as text from metadata.

The image 534 may be, for example, an image of a rendered environment instance. In some implementations, multiple images for a particular environment instance may be stored, and the image that is most relevant to the query may be selected. For example, as show in FIG. 5 the image 534 includes an image for a stock quote for the Goog symbol, and the image is selected because the search query specifies the Goog symbol. The virtual machine 120 may, for example, be configured to collect a series of images for a particular environment instance if the environment instance can be rendered for different input parameters (e.g., stock tickers, movie titles, etc.). In some implementations, the images that are stored may be for the N most popular values that are provided from users, e.g., the top 100 most requested stocks, the top 100 most requested movies, etc.

The native application search result 530 includes a deep link, and selection of the search result 530 at the user device causes the native application to launch and generate an instance of the environment instance that includes content that is relevant to the search query. For example, provided the native application Stock Quoter for Andriod™ is installed on the user device, selecting the image 534 causes the native application to launch and generate the environment instance that corresponds to the image 534 but with more current content. Furthermore, the environment instance is rendered to display the current stock quote for the Goog symbol. This can be accomplished, for example, by passing the input value of Goog in a command line for the native application.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by data processing apparatus comprising one or more computers in data communication, the method comprising:
    for each deep link in a first set of deep links specified for a native application, each deep link specifying a particular environment instance of the native application and configured to cause the native application to instantiate an instance of the specified native application, and wherein the native application is an application operable to generate environment instances for display within the native application on a user device, the native application operating independent of a browser application that can operate on the user device, receiving verification data that specifies that deep link is verified to cause the native application of a first version level to correctly instantiate the environment instance specified by the deep link;
    storing the verification data and the deep link in an index of deep links;
    receiving selections of deep links to be served to user devices within which the native application is installed, each selection for a corresponding user device;
    for each selection:
        determining a version level of the native application installed within the corresponding user device; and
        serving the deep link selection only if the version level of the native application installed within the corresponding user device is the same as or subsequent to the version level for which it is verified.

2. The computer-implemented method of claim 1, further comprising:
    for each deep link in a second set of deep links specified for a native application, each deep link specifying a particular environment instance of the native application and configured to cause the native application to instantiate an instance of the specified application, receiving verification data that specifies that the deep link is verified for the second version level of the native application, wherein the second version is a later version than the first version;

storing the verification data and the deep link in an index of deep links;

receiving selections of deep links to be served to user devices within which the native application is installed, each selection for a corresponding user device;

for each selection:
    determining a version level of the native application installed within the corresponding user device; and
    serving the deep link selection only if the version level of the native application installed within the corresponding user device is the same as or subsequent to the version level for which it is verified.

3. The computer implemented method of claim 2, wherein the first set of deep links and the second set of deep links include at least one common deep link.

4. The computer implemented method of claim 2, wherein the first set of deep links includes at least one deep link not included in the second set of deep links, and serving the deep link selection comprises:
    serving the deep link selection for the at least one deep link only if the version level of the native application installed within the corresponding user device is the first version level.

5. The computer implemented method of claim 1, wherein each deep link comprises a uniform resource identifier (URI) that includes a unique application identifier that identifies the native application.

6. A system, comprising:
    a data processing apparatus; and
    software stored in non-transitory computer readable storage medium storing instructions executable by the data processing apparatus and that upon such execution cause the data processing apparatus to perform operations comprising:
        for each deep link in a first set of deep links specified for a native application, each deep link specifying a particular environment instance of the native application and configured to cause the native application to instantiate an instance of the specified native application, and wherein the native application is an application operable to generate environment instances for display within the native application on a user device, the native application operating independent of a browser application that can operate on the user device, receiving verification data that specifies that deep link is verified to cause the native application of a first version level to correctly instantiate the environment instance specified by the deep link;
        storing the verification data and the deep link in an index of deep links;
        receiving selections of deep links to be served to user devices within which the native application is installed, each selection for a corresponding user device;
        for each selection:
            determining a version level of the native application installed within the corresponding user device; and
            serving the deep link selection only if the version level of the native application installed within the corresponding user device is the same as or subsequent to the version level for which it is verified.

7. The system of claim 6, the operations further comprising:
    for each deep link in a second set of deep links specified for a native application, each deep link specifying a particular environment instance of the native application and configured to cause the native application to instantiate an instance of the specified application, receiving verification data that specifies that the deep link is verified for the second version level of the native application, wherein the second version is a later version than the first version;
    storing the verification data and the deep link in an index of deep links;
    receiving selections of deep links to be served to user devices within which the native application is installed, each selection for a corresponding user device;
    for each selection:
        determining a version level of the native application installed within the corresponding user device; and
        serving the deep link selection only if the version level of the native application installed within the corresponding user device is the same as or subsequent to the version level for which it is verified.

8. The system of claim 7, wherein the first set of deep links and the second set of deep links include at least one common deep link.

9. The system of claim 8, wherein the first set of deep links includes at least one deep link not included in the second set of deep links, and serving the deep link selection comprises:
    serving the deep link selection for the at least one deep link only if the version level of the native application installed within the corresponding user device is the first version level.

10. The system of claim 6, wherein each deep link comprises a uniform resource identifier (URI) that includes a unique application identifier that identifies the native application.

11. A non-transitory computer readable storage medium storing instructions executable by a data processing apparatus and that upon such execution cause the data processing apparatus to perform operations comprising:
    for each deep link in a first set of deep links specified for a native application, each deep link specifying a particular environment instance of the native application and configured to cause the native application to instantiate an instance of the specified native application, and wherein the native application is an application operable to generate environment instances for display within the native application on a user device, the native application operating independent of a browser application that can operate on the user device, receiving verification data that specifies that deep link is verified to cause the native application of a first version level to correctly instantiate the environment instance specified by the deep link;
    storing the verification data and the deep link in an index of deep links;
    receiving selections of deep links to be served to user devices within which the native application is installed, each selection for a corresponding user device;
    for each selection:
        determining a version level of the native application installed within the corresponding user device; and
        serving the deep link selection only if the version level of the native application installed within the corresponding user device is the same as or subsequent to the version level for which it is verified.

12. The non-transitory computer readable storage medium of claim 11, the operations further comprising:
- for each deep link in a second set of deep links specified for a native application, each deep link specifying a particular environment instance of the native application and configured to cause the native application to instantiate an instance of the specified application, receiving verification data that specifies that the deep link is verified for the second version level of the native application, wherein the second version is a later version than the first version;
- storing the verification data and the deep link in an index of deep links;
- receiving selections of deep links to be served to user devices within which the native application is installed, each selection for a corresponding user device;
- for each selection:
    - determining a version level of the native application installed within the corresponding user device; and
    - serving the deep link selection only if the version level of the native application installed within the corresponding user device is the same as or subsequent to the version level for which it is verified.

13. The non-transitory computer readable storage medium of claim 12, wherein the first set of deep links and the second set of deep links include at least one common deep link.

14. The non-transitory computer readable storage medium of claim 13, wherein the first set of deep links includes at least one deep link not included in the second set of deep links, and serving the deep link selection comprises:
- serving the deep link selection for the at least one deep link only if the version level of the native application installed within the corresponding user device is the first version level.

15. The non-transitory computer readable storage medium of claim 11, wherein each deep link comprises a uniform resource identifier (URI) that includes a unique application identifier that identifies the native application.

* * * * *